(12) United States Patent
Röttger et al.

(10) Patent No.: US 11,318,538 B2
(45) Date of Patent: May 3, 2022

(54) BRAKE DISC TOOL FOR MACHINING A BRAKE DISC BLANK, BRAKE DISC PRODUCTION PLANT AND METHOD FOR PRODUCING A BRAKE DISC

(71) Applicant: ECOROLL AG WERKZEUGTECHNIK, Celle (DE)

(72) Inventors: Karsten Röttger, Celle (DE); Zied Heni, Hannover (DE)

(73) Assignee: ECOROLL AG WERKZEUGTECHNIK, Celle (DE)

( * ) Notice: Subject to any disclaimer, the term of this patent is extended or adjusted under 35 U.S.C. 154(b) by 313 days.

(21) Appl. No.: 16/327,365

(22) PCT Filed: Aug. 14, 2017

(86) PCT No.: PCT/EP2017/070621
§ 371 (c)(1),
(2) Date: Apr. 4, 2019

(87) PCT Pub. No.: WO2018/036858
PCT Pub. Date: Mar. 1, 2018

(65) Prior Publication Data
US 2019/0314897 A1    Oct. 17, 2019

(30) Foreign Application Priority Data

Aug. 25, 2016  (DE) .................... 10 2016 115 819.4
Sep. 27, 2016  (DE) .................... 10 2016 118 270.2

(51) Int. Cl.
*B23B 5/02*   (2006.01)
*F16D 65/00*  (2006.01)
*F16D 65/12*  (2006.01)

(52) U.S. Cl.
CPC .......... *B23B 5/02* (2013.01); *B23B 2235/045* (2013.01); *F16D 65/0043* (2013.01); *F16D 65/12* (2013.01); *F16D 2250/0038* (2013.01)

(58) Field of Classification Search
CPC ......... F16D 2250/0038; F16D 65/0043; F16D 65/12; F16D 65/127; B23B 2235/045; B23B 5/02; B23P 9/02; B24B 39/06
(Continued)

(56) References Cited

U.S. PATENT DOCUMENTS

| 3,448,504 A | 6/1969 | Dombrowski et al. |
| 3,691,878 A * | 9/1972 | Mitchell ............ B23Q 11/0032 82/1.11 |

(Continued)

FOREIGN PATENT DOCUMENTS

| DE | 10 2005 015 649 B4 | 7/2007 |
| DE | 10 2014 215 060 A1 | 3/2015 |

(Continued)

*Primary Examiner* — Sara Addisu
(74) *Attorney, Agent, or Firm* — WC&F IP (57) ABSTRACT

A brake disc tool for machining a brake disc blank is provided. The brake disc tool includes a first cutting tool which is arranged to cut a first brake surface of the brake disc blank, a second cutting tool which is arranged to cut a second brake surface of the brake disc blank, a first forming tool for forming the first brake surface, a second forming tool for forming the second brake surface, and at least one infeed device for the infeed of the cutting tools and the forming tools towards one another, such that a brake disc blank arranged between the cutting tools and the forming tools is able to be machined and rolled in each case simultaneously on both of its brake surfaces.

8 Claims, 8 Drawing Sheets

(58) Field of Classification Search
USPC .......................................... 451/66, 269, 262
See application file for complete search history.

(56) References Cited

U.S. PATENT DOCUMENTS

| | | | | |
|---|---|---|---|---|
| 3,866,281 | A | | 2/1975 | Kunze |
| 4,226,146 | A | * | 10/1980 | Ekman ..................... B23B 5/04 82/112 |
| 4,262,452 | A | * | 4/1981 | Lopez .................... B24B 23/00 451/210 |
| 4,266,454 | A | * | 5/1981 | Mitchell .................. B23B 5/02 188/378 |
| 4,510,828 | A | * | 4/1985 | Bogaerts .................. B23B 5/02 82/112 |
| 5,152,104 | A | * | 10/1992 | Wood ....................... B24B 7/17 451/269 |
| 7,047,622 | B2 | * | 5/2006 | Kroener ................... B23B 5/02 29/557 |
| 2007/0000360 | A1 | | 1/2007 | Colarelli, III et al. |
| 2016/0178019 | A1 | | 6/2016 | Stephenson et al. |

FOREIGN PATENT DOCUMENTS

| | | | | |
|---|---|---|---|---|
| EP | 1 048 873 | A1 | | 11/2000 |
| JP | 57184602 | A * | 11/1982 | ............... B23B 5/02 |
| JP | 59037002 | A * | 2/1984 | ............... B23B 5/02 |
| JP | 2001260014 | A * | 9/2001 | |
| JP | 2005 205532 | A | | 8/2005 |
| WO | 94/00260 | A1 | | 1/1994 |

\* cited by examiner

BRAKE DISC TOOL FOR MACHINING A BRAKE DISC BLANK, BRAKE DISC PRODUCTION PLANT AND METHOD FOR PRODUCING A BRAKE DISC

The invention relates to a brake disc tool for machining a brake disc blank. According to a second aspect, the invention relates to a method for producing a brake disc.

A brake disc is a component of a disc brake and is produced by first of all producing a brake disc blank. The brake disc blank is then machined on both of its brake surfaces by way of rotational machining and the resulting machined surface is then formed, for example flat-rolled or deep-rolled or smoothed, by a friction smoothing element. It is preferable to produce brake discs as efficiently as possible, i.e. achieving a high quality in the shortest possible time.

It is common to initially rotate the brake surfaces and to then form them in a subsequent process. This results in a comparatively long production time.

The invention aims to improve the production of brake discs.

The invention solves the problem by means of a brake disc tool for machining a brake disc blank with (a) a first cutting tool which is arranged to cut, in particular by way of turning, a first brake surface of the brake disc blank, (b) a second cutting tool which is arranged to cut, in particular by way of turning, a second brake surface of the brake disc blank, (c) a first forming tool for forming the first brake surface, (d) a second forming tool for forming, in particular flat-rolling or deep-rolling, the second brake surface, and (e) an infeed device for the infeed of the cutting tools and/or the forming tools towards one another, such that a brake disc blank arranged between the cutting tools and the forming tools is able to be machined and rolled in each case simultaneously on both of its brake surfaces.

According to a second aspect, the invention solves the problem by means of a method for producing a brake disc, during which a brake disc blank is machined by means of a brake disc tool according to the invention.

The advantage of the invention is that the production of brake discs can be considerably accelerated. This means that the two brake surfaces can be machined simultaneously, i.e. at the same time, which reduces the machining time. According to a preferred embodiment, it is also possible to simultaneously cut and form, especially to roll, the two brake surfaces. This reduces the production time even further.

It is also beneficial if a higher surface quality can be achieved. If the forming tools, especially in the form of flat-rolling or deep-rolling tools, press on the respective brake surface on a side which lies precisely opposite the other, as is intended according to a preferred embodiment, the respective rolling forces counter one another and no axial bending of the brake disc blank occurs. A further advantage is that the forming tools can therefore be pressed onto the brake surface with a greater pressure, allowing a flatter surface to be achieved.

Within the scope of the present description, a cutting tool should be understood particularly to mean a tool, by means of which a chip can be removed from the brake surface. For example, the cutting tool is an exchangeable cutting plate, in particular an insert.

A forming tool should be understood especially to mean a tool that locally forms the brake surface. According to a preferred embodiment, the forming tool is a rolling tool. A rolling tool comprises a rolling element and a guide which guides the rolling element. The rolling element may be an ellipsoid, for instance, in particular a sphere.

Alternatively, at least one of the rolling tools is a sliding smoothing tool, in particular both rolling tools are sliding smoothing tools. A sliding smoothing tool does not have any rotating parts and smooths the workpiece surface. For instance, the smoothing tool may be made out of a hard material, especially diamond. It is possible and represents a preferred embodiment for the smoothing tool to be cooled. To this end, the brake disc tool preferably has a cooling device that is connected to the smoothing tool.

The two cutting tools are preferably arranged in such a way that during operation of the brake disc tool, the passive forces which are acting on the cutting tools act in the opposite direction to one another and at least largely counterbalance one another. In particular, the cutting tools are arranged in such a way that a resulting torque acting on the brake disc blank is a maximum of one fifth, especially a maximum of one tenth, of the torque that occurs if only one cutting tool is in operation.

In addition, the forming tools are preferably arranged such that the forming forces are opposing forces and at least largely counterbalance one another. The forming tools are also preferably arranged such that the resulting torque acting on the brake disc is a maximum of one fifth, especially a maximum of one tenth, of the value that would occur if only one forming tool were available.

According to a preferred embodiment, the infeed device is designed for the infeed of the cutting tools and the forming tools towards one another, such that the brake disc blank is able to be simultaneously machined and rolled simultaneously on both brake surfaces, and away from one another, such that the tools can be disengaged. In other words, both brake surfaces can then be simultaneously machined and formed, in particular rolled. Of course, it is possible that the cutting tools and the forming tools are not engaged with the brake surface at every given moment.

However, it is beneficial if the forming tools and the cutting tools are arranged in such a way that the period during which only the cutting tools and/or only the forming tools engage with the brake disc represents a maximum of one fifth of the entire machining time when the brake disc tool is moved at a constant speed. This renders it possible to produce a brake disc in a considerably shorter time.

The brake disc tool preferably features a tool mount for attaching the brake disc tool to a tool machine, wherein the infeed device comprises a cutting tool infeed device for moving the first chipping tool relative to the tool mount. It is preferable, but not necessary, for the infeed device to have a second cutting tool infeed device for moving the second chipping tool relative to the tool mount. This allows the chipping tools to be moved into their correct position relative to the brake disc blank.

The infeed device preferably has a forming tool infeed device for moving the first forming tool independently from the first chipping tool relative to the tool mount. It is preferable, but not necessary, for the infeed device to also have a second cutting tool infeed device for moving the second chipping tool independently from the second chipping tool relative to the tool mount. In other words, it is beneficial if the infeed device features two cutting tool infeed devices and two forming tool infeed devices, such that all tools are configured so they can be moved relative to the tool mount. Alternatively, the infeed device is configured to move the first forming tool along with the first chipping tool and/or to move the forming tools at the same time.

According to a preferred embodiment, the tool mount is mounted in such a way that, during machining, the cutting tool moves on one path that extends along a cutting tool line, wherein the cutting tool line is at a distance from a rotational axis of the rotational movement, this distance being smaller than half, preferably smaller than one twentieth, especially one fiftieth, of an outer diameter of a hub section of the brake disc.

It is favorable if the at least one forming tool infeed device is designed to set a predetermined forming pressure. If the forming tool is a rolling tool, the forming tool infeed device is preferably configured to automatically set, especially to adjust, to a predetermined target rolling pressure.

The invention also relates to a brake disc production system which (a) comprises a machine tool that rotates a brake disc rotation device in order to accommodate and rotate a brake disc blank about the rotational axis, about which the finished brake disc rotates during operation, and with (b) a brake disc tool according to the invention that is arranged in relation to the brake disc rotation device such that a brake disc blank that has been accommodated and rotated by the brake disc rotation device can be machined on both brake surfaces simultaneously by rotational machining and/or simultaneously by way of forming, especially rolling.

According to a preferred embodiment, the brake disc rotation device is arranged relative to the cutting tools and the forming tools such that (i) the first cutting tool engages, especially to its deepest point, at a first cutting point of engagement which is at a first cutting distance from the rotational axis, (ii) the second cutting tool engages, especially to its deepest point, at a second cutting point of engagement which is at a second cutting distance from the rotational axis, (iii) the first forming tool engages at a first forming point of engagement which is at a first forming distance from the rotational axis, (iv) the second forming tool engages at a second forming point of engagement which is at a second forming distance from the rotational axis and (v) the cutting tools and the forming tools can be moved in such a way that a first difference in distance between the first cutting distance and a first forming distance and a second difference in distance between the second cutting distance and a second forming distance remains constant and/or is at the most as great as a radial distance between a brake surface and a hub section of the brake disc blank which protrudes axially above a brake surface plane on which the first brake surface lies. This ensures that the brake surfaces can be machined across their entire radial width.

It is especially preferable if the brake disc production system has a control unit that is designed to automatically execute a method with the steps (i) rotation of the brake disc blank by means of the brake disc rotation device in a first direction of rotation and the simultaneous machining of the brake surfaces by means of the cutting tools, and (ii) subsequent rotation of the brake disc blank by means of the brake disc rotation device—in a direction of rotation that is opposite to the first direction of rotation or the same direction of rotation—and the simultaneous machining of the brake surfaces by means of the forming tools. The advantage of this method is that the optimal rotation speed for the respective machining processes can be selected. It is possible that a feed direction of the forming tools during forming is the opposite direction to a feed direction of the cutting tools during cutting.

It is especially beneficial if the control unit it configured to automatically move the cutting tool during machining on a—preferably straight—path (i.e. a line) that extends along a cutting tool line, wherein the cutting tool line is at a distance from a rotational axis of the rotational movement, this distance being less than half, preferably smaller than one tenth, especially one twentieth, of a hub section of the brake disc. It is particularly beneficial if the cutting tool line intersects the rotational axis. In this case, the chip angle and the clearance angle during the radial movement of the cutting tool remain constant. Therefore, a simply designed tool can be used.

According to an alternative embodiment, the control unit is configured to automatically move the cutting tool during machining on a cutting tool path that extends along a cutting tool line, wherein the cutting tool line is at a distance from a rotational axis of the rotational movement, this distance being at least one tenth, especially at least one twentieth, of an outer diameter of the brake disc. This has the advantage that the forming tools, as is intended according to a preferred embodiment, can be arranged such that they are in contact with the brake surface at an at least essentially equal axial distance from the rotational axis as the cutting tool. In turn, this has the advantage that the total number of revolutions that the brake disc blank must cover in order to be fully machined is especially small. A further advantage is that the minimum distance of the cutting tool from the rotational axis is especially large. This enables brake disc blanks to be processed whereby a radial distance between the brake surfaces and a hub section, which protrudes axially over a brake surface plane on which the brake surface lies, is especially small.

The first forming tool is preferably mounted such that it moves on a forming tool path, which extends along a forming tool line, when the cutting tool moves on the cutting tool path, wherein the forming tool line is separated from the cutting tool line by a separating plane on which the rotational axis runs. In other words, the chipping tool moves forward, the forming tool follows. This has the slight disadvantage that the chip angles may change depending on the radial distance of the cutting tool from the rotational axis; however, this is counterbalanced by the advantage that the minimum radial distance of the cutting tool is especially great.

It is especially preferable if a distance between the forming tool line and the separating plane deviates from the distance between the cutting tool line ($g_Z$) and the separating plane (T) by a maximum of 50%, preferably by a maximum of 30%. In other words, the quotient resulting from the smaller of the two distances as a numerator and the greater of the two distances as a denominator is at least 0.5. It is particularly preferable if the distance between the forming tool line and the separating plane corresponds to the distance between the cutting tool line and the separating plane. The feature that the two distances correspond to one another should be understood especially to mean that it is possible and preferable that the two distances are equal in the mathematical sense, but that it is also possible that the two distances deviate slightly from one another. For instance, a deviation of 10% is tolerable.

In particular, the cutting tools are fixed to the tool mount in such a way that they can engage and disengage with the brake surface by way of a motor. The forming tools are also preferably fixed to the tool mount, in particular they are fixed in such a way that they can engage and disengage with the brake surface. Alternatively, a forming tool is or the forming tools are fixed to a second tool mount, which can be moved independently from the first tool mount, on the machine tool and connected to the machine tool by means of this second tool mount.

The control unit is preferably configured to automatically conduct a method according to the invention.

According to a preferred embodiment, the brake surfaces are cut while the cutting tools are moved radially inwards. The feature that the cutting tools are moved radially inwards should be understood especially to mean that a radial distance of the cutting tools from the rotational axis reduces over time.

Alternatively, the brake surfaces are cut while the cutting tools are moved radially outwards. It is then possible to cut and form simultaneously; alternatively, the forming tools are moved radially inwards during forming.

A method is preferred during which (i) the first cutting tool engages to its deepest point at a first cutting point of engagement which is at a first cutting distance from the rotational axis, (ii) the second cutting tool engages to its deepest point at a second cutting point of engagement which is at a second cutting distance from the rotational axis, (iii) the first forming tool engages at a first forming point of engagement which is at a first forming distance from the rotational axis, (iv) the second forming tool engages at a second forming point of engagement which is at a second forming distance from the rotational axis and (v) the cutting tools and the forming tools can be moved in such a way that, as long as all tools are engaged, a first difference in distance between the first cutting distance and a first forming distance and a second difference in distance between the second cutting distance and a second forming distance remains constant and/or is at the most as great as a radial distance between a brake surface and a hub section of the brake disc blank which protrudes axially above a brake surface plane on which the first brake surface lies.

In other words, it is favorable if the first cutting tool and the second forming tool are rigidly coupled with one another in relation to a movement in the radial direction. Furthermore, it is beneficial if the second cutting tool and the second forming tool are correspondingly rigidly couple with one another.

If the differences in distance correspond at the most to the given radial distance between the brake surface and hub section, the cutting tool does not affect the hub section if the forming tool is still engaged. It is therefore possible to form the full width of the brake surface.

The first forming tool and/or the first cutting tool are/is preferably mounted such that they/it are guided, especially linearly guided. If both tools are linearly guided, the directions of extension of the two guides form a first spread angle $\sigma_1$. The spread angle $\sigma_1$ is preferably essentially 0°, especially smaller than 2°. Alternatively, it is possible that the spread angle is greater than 5° and in particular smaller than 45°. In this case, the first forming tool and the first cutting tool move towards one another when they are moved radially inwards.

The second forming tool and/or the second cutting tool are/is preferably mounted such that they/it are guided, especially linearly guided. If both second tools are linearly guided, the directions of extension of the two guides form a second spread angle $\sigma_2$. The spread angle $\sigma_2$ is preferably essentially 0°, especially smaller than 2°. Alternatively, it is possible that the spread angle is greater than 5° and in particular smaller than 45°. In this case, the second forming tool and the second cutting tool move towards one another when they are moved radially inwards.

It is favorable if the direction of extension of at least one of the guides, particularly the guide of a cutting tool, runs towards the rotational axis.

According to a preferred embodiment, the brake disc tool has a vibration damping device for dampening vibrations of the cutting tool and/or the forming tool. The vibration damping device may be a passive or an active vibration damping device. An active damping device has an actuator for converting external energy, such as electric energy, into a movement that counters the vibration movement. A passive vibration damping device works without a supply of additional energy. A hydraulic vibration damping device is especially preferable. This should be understood to mean a vibration damping device which dissipates the motion energy by way of the internal friction of a fluid.

A method with the following steps is preferred: (i) infeed of the cutting tools and the forming tools towards the brake surfaces of a brake disc blank, and (ii) rotation of the brake disc blank and simultaneous cutting of the brake surfaces and simultaneous forming, in particular flat-rolling or deep-rolling—preferably with at least one rotating rolling element and/or at least one sliding frictional element—of the two brake surfaces. The tools are preferably moved radially inwards.

Alternatively, it is possible that the method features the following steps: initial disengagement of the cutting tools by moving them radially inwards, wherein it is possible but not necessary for the forming tools to disengage simultaneously by moving them radially inwards, the subsequent engagement of the cutting tools with the brake disc blank—and if the forming tools have been disengaged by way of a radially inwards movement: the engagement of the forming tools—and the subsequent movement of the cutting tools radially outwards and thereby the cutting of the brake surfaces. If the forming tools are engaged, the brake surfaces are simultaneously formed. It is beneficial if the brake surfaces are rolled during a radially outwards movement. Alternatively, it is possible that the rolling is conducted following the cutting of the brake surfaces.

A method with the following steps is preferred: (i) infeed of the cutting tools, (ii) rotation of the brake disc blank in a first direction of rotation and the cutting of the braking surfaces, then (iii) rotation of the brake disc blank—in the same or an opposite direction of rotation—and the simultaneous forming, especially deep-rolling or flat-rolling—preferably with at least one rotating rolling element and/or at least one sliding frictional element—of the two brake surfaces. It is possible that the feed direction during forming is the opposite direction to a feed direction during cutting. In particular, the cutting tool is moved radially inwards during cutting and the forming tool outwards during forming, or vice-versa.

It is possible that the radial distance between the brake surface and the hub section is comparatively small. It is particularly advantageous if the method comprises the following steps: (i) radially inwards movement of the forming tools and the cutting tools with at least essentially the same radial movement components, then (ii) the reduction, especially the stopping, of the radially inwards movement of the cutting tools, and (iii) continued radially inwards movement of the forming tools.

Alternatively, it is possible that the forming tools, after engaging, are moved radially outwards, wherein the forming tools do not initially move radially outwards and engage at a later point in time during cutting. Following the engagement of the forming tools, the cutting tools and the forming tools can be moved radially outwards at at least essentially the same radial speed. Speeds which are essentially the same should be understood to mean speeds which differ on average by a maximum of 10%.

In the following, the invention will be explained in more detail by way of the attached drawings. They show FIG. 1 with the partial images 1a-1d, a brake disc tool according to the invention, according to a first embodiment, FIG. 2 with the partial images 2a-2d, a brake disc tool according to the invention, according to a second embodiment, FIG. 3 a schematic view of a brake disc production system according to the invention for executing a method according to the invention, FIG. 4 with the partial images 4a-4f, a brake disc tool according to the invention, according to a third embodiment, FIG. 5 with the partial images 5a-5f, a brake disc tool according to the invention, according to a fourth embodiment, FIG. 6 with the partial images 6a-6f, a brake disc tool according to the invention, according to a fifth embodiment, FIG. 7 with the partial images 7a-7e, a brake disc tool according to the invention, according to a sixth embodiment, FIG. 8 with the partial images 8a-8b, a brake disc tool according to the invention, according to a seventh embodiment.

Figure 1A:
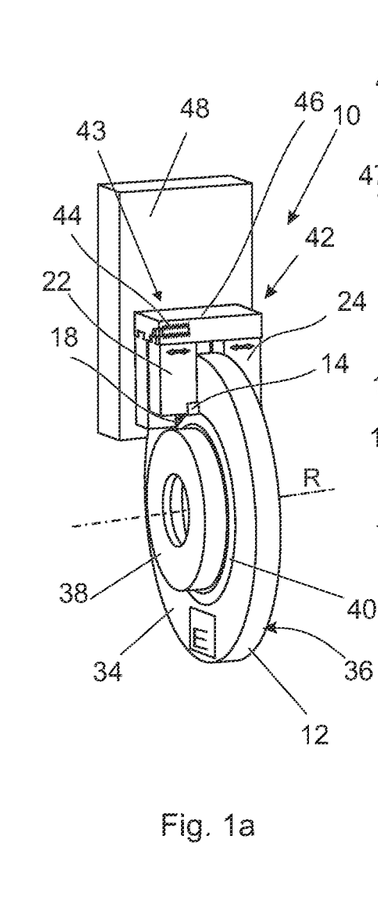
Figures 1B, 1C:
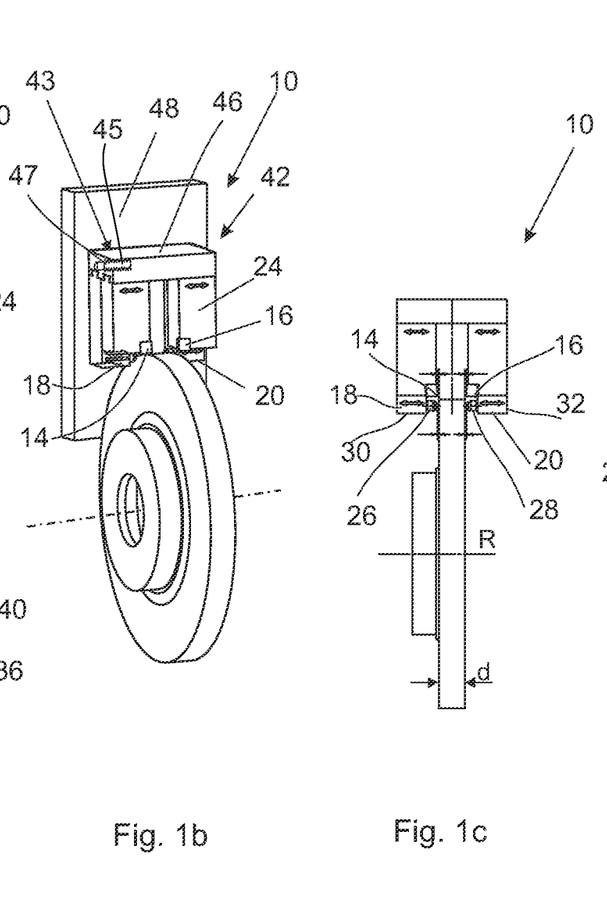

Partial image 1a in FIG. 1 shows a brake disc tool 10 according to the invention for machining a brake disc blank 12, thereby producing a brake disc. The brake disc tool 10 features a first cutting tool 14, a second cutting tool 16 (see FIG. 1b), a first forming tool 18 and a second forming tool 20.

The first forming cutting tool 14 comprises an insert, for example made of ceramic, hard metal, coated hard metal, a cermet or cubic boron nitride. The first cutting tool 14 is accommodated in a first tool accommodation 22; the second cutting tool 16 is constructed in the same as the first cutting tool 14 and is fixed to a second tool accommodation 24.

The forming tools 18, 20 are designed to be rolling tools and each have rolling elements 26, 28, each of which is accommodated in a guide 30, 32. A pressurized fluid is applied to the forming tools 18, 20 by means of a pressurized fluid source (not shown). The pressurized fluid may refer to a liquid, a gas or an aerosol, in particular a lubricating particle mist.

The cutting tool 14 and the first forming tool 18 are configured to machine a first brake surface 34. The second cutting tool 16 and the second forming tool 20 are configured to machine a second brake surface 36, which runs parallel to the first brake surface 34. The brake disc blank 12 also comprises a hub section 38, which protrudes axially above a brake disc plane E, on which the first brake surface 34 lies. A circumferential groove 40 runs between the hub section 38 and the first brake surface 34.

The brake disc tool 10 has an infeed device 42, by means of which the cutting tools 14, 16 and the forming tools 18, 20 can be fed in towards one another. This renders it possible to precisely set a disc thickness d, i.e. a distance between the first brake surface 34 and the second brake surface 36. In the present case, the infeed device 42 has a cutting tool infeed device 43 for moving the first cutting tool 14 relative to the tool mount 46.

In the present case, the cutting tool infeed device 43 comprises the first tool accommodation 22 and a schematically depicted drive 44 which, for instance, may feature a drive worm and a rotary drive. The first tool accommodation 22 is linearly guided on a tool mount 46 in the axial direction in relation to a rotational axis R of the brake disc blank 12.

The first tool accommodation 22 can thus be moved relative to the tool mount 46 by means of the drive 44.

According to a preferred embodiment, the second tool accommodation 24 and the forming tools 18, 20 are also linearly guided by the tool mount 46 and can be moved relative to it. In the present embodiment, the infeed device 42 comprises a forming tool infeed device 45 for moving the first forming tool 18 relative to the tool mount 46 (see FIG. 1b). The forming tool infeed device 45 is constructed in the same way as the cutting tool infeed device 43 and has a drive 47. In FIG. 1b, the drive 44 is not depicted for the sake of clarity.

However, it is also possible that one drive moves both tool accommodations 22, 24 and another drive moves both forming tools 18, 20. It is also possible that both cutting tools 14, 16 and both forming tools 18, 20 are designed such that they can be moved relative to the tool mount 46 by means of a motor. In this case, it is not necessary for the tool mount 46 to be designed so that it can be moved relative to the brake disc blank 12.

The drive 44 and the additional drives, if present, may comprise an electric motor or be driven hydraulically. The drive 44 and the other available drives, if present, may also comprise at least one hydraulic expansion cushion and a pressurized fluid supply connected to said cushion, which move the respective tool either towards or away from the brake disc blank 12 upon an increase in fluid pressure in the hydraulic expansion cushion.

In the present case, the tool mount is fixed to a linear guide 48 and can thus be moved in a direction that is perpendicular to a rotational axis R.

FIG. 1c shows a view of the brake disc tool 10 from the front.

Figure 1D:
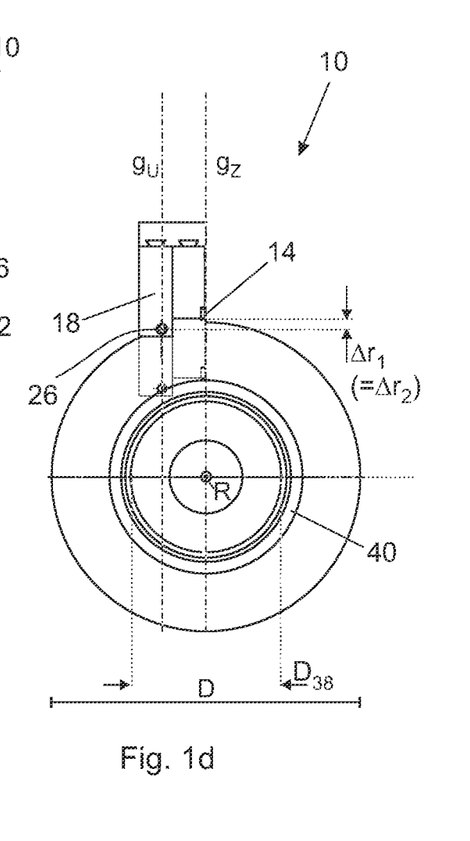

FIG. 1d shows that in the present case, the cutting tools 14, 16 (see FIG. 1c) and the forming tools 18, 20 are mounted by means of the tool mount 46 and the linear guide 48 in such a way that the first cutting tool 14 moves along a cutting tool line $g_Z$. The first forming tool 18 moves along a forming tool line $g_U$. The cutting tool line $g_Z$ intersects the rotational axis R. However, it is also possible that it is at a small distance, different from zero, from the rotational axis R, which is for instance smaller than one fiftieth of an outer diameter D of the brake disc blank 12. The forming tool line $g_U$ runs parallel to the cutting tool line $g_Z$.

According to an alternative method according to the invention, it is possible that the tools 14, 16, 18, 20 are disengaged by way of a radially inwards movement. The cutting tools 14, 16 then engage with the radially inward edge of the brake surfaces 34, 36 and are moved radially outwards. The forming tools 16, 18 also engage. This means that the brake surfaces 34, 36 are simultaneously cut and formed while the tools 14, 16, 18, 20 move radially outwards.

Figure 2A:
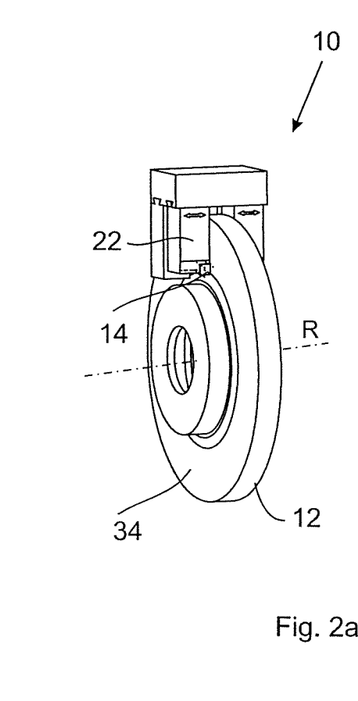
Figure 2B:
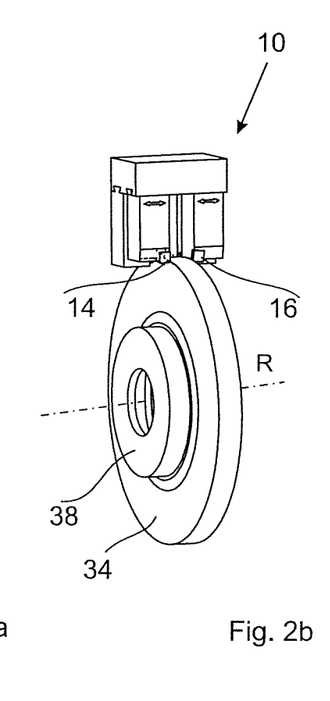
Figures 2C, 2D:
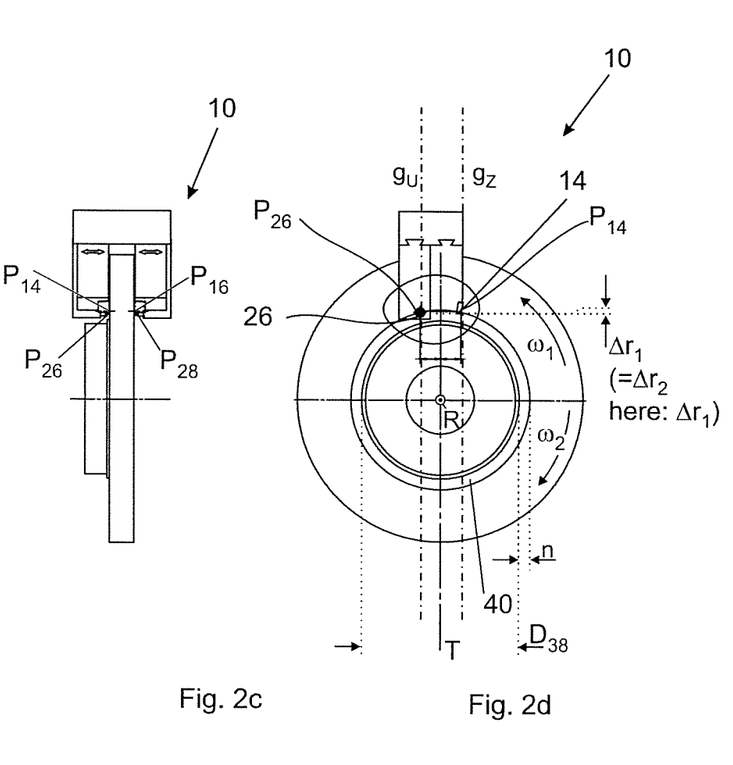

FIG. 2 shows a second embodiment of a brake disc tool 10 according to the invention. FIG. 2d shows that, unlike the embodiment according to FIG. 1, the lines $g_Z$ and $g_U$ are at the same distance from the rotational axis R and thus from a separating plane T on which the rotational axis runs. The first cutting tool 14 and the rolling element 16 can therefore be arranged at the same or essentially the same radial distance from the rotational axis R.

In other words, the first cutting tool 14 comes into contact with the brake surface 34 at a first cutting point of engagement $P_{14}$ and the first forming tool 18 at a first forming point of engagement $P_{26}$.

A difference in distance Δr, which indicates the difference of the radial distances of the points $P_{14}$ and $P_{26}$ from the rotational axis R, is small. In particular, the difference in distance Δr is smaller than a groove width n. Groove width is the radial distance between the first brake surface 34 and the hub section 38 (see FIG. 2b). The difference in distance Δr is preferably smaller than 0.8-times the groove width n.

The second cutting tool 16, when at a second cutting point of engagement $P_{16}$ (FIG. 2c), lies flat on the second brake surface 36 and the rolling element 28 of the second forming tool 20, when at a second forming point of engagement $P_{28}$, lies flat on the second brake surface 36. The radial distance of the point $P_{16}$ from the rotational axis R corresponds to the radial distance of the point $P_{14}$. The radial distance of the point $P_{28}$ corresponds to the radial distance of the point $P_{26}$.

Figure 3:
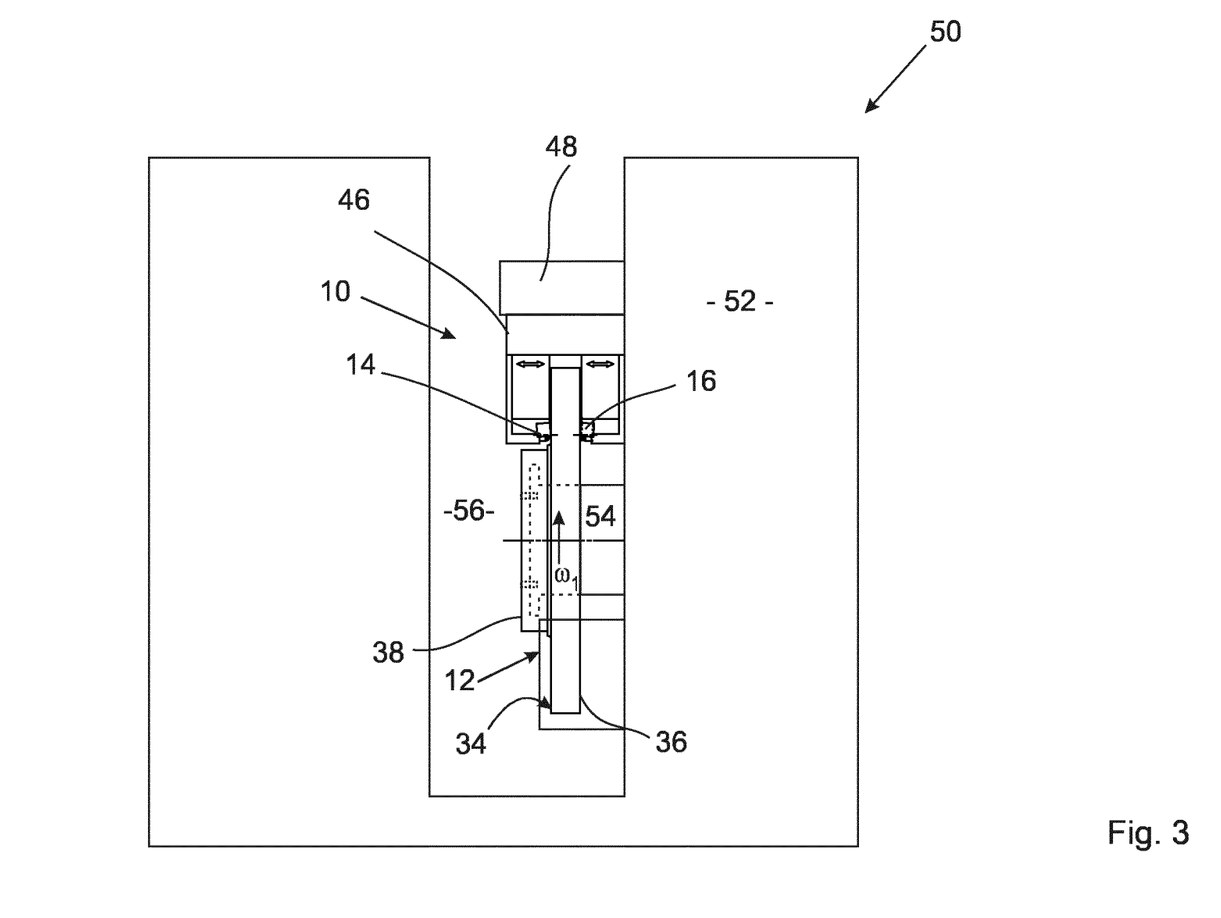

FIG. 3 schematically depicts a brake disc production system 50 according to the invention, this system comprising a brake disc tool 10 and a machine tool 52, by means of which the brake disc tool 10 can be positioned relative to a brake disc rotation device 54. The brake disc rotation device 54 is designed to accommodate the brake disc blank 12, for example at its hub section 38. A stamp 56 that can be fed in may also be provided, which for example catches in the hub section 38 by way of holes.

A method according to the invention is executed, for example, by the brake disc blank 12 first of all being accommodated on the brake disc rotation device 54. It is then rotated in a direction of rotation $\omega_1$. The cutting tools 14, 16 are fed in onto the brake surfaces 34, 36, either individually or collectively, until the distance between the two corresponds to a predetermined disc thickness d. The cutting tools 14, 16 are then moved in the radial direction along the line $g_Z$ and cut the brake surfaces 34, 36.

The cutting tools 14, 16 then disengage. The forming tools 18, 20 are also fed in so far onto the machined brake surfaces 34, 36 that the respective rolling elements 26, 28 come into contact with the brake surfaces 34, 36 and form them. It is possible, but not necessary, for the rotation speed during forming to be the same as during cutting. For instance, it is possible that cutting is conducted at a higher speed than forming.

A predetermined rolling pressure is applied to the rolling elements 26, 28 and the forming tools 18, 20 are guided on the brake surfaces 34, 36 in the radial direction, such that they are deep and/or flat-rolled. Following this machining, the brake disc blank 12 has become a brake disc. It is possible that this is followed by further machining steps.

Figure 4A:
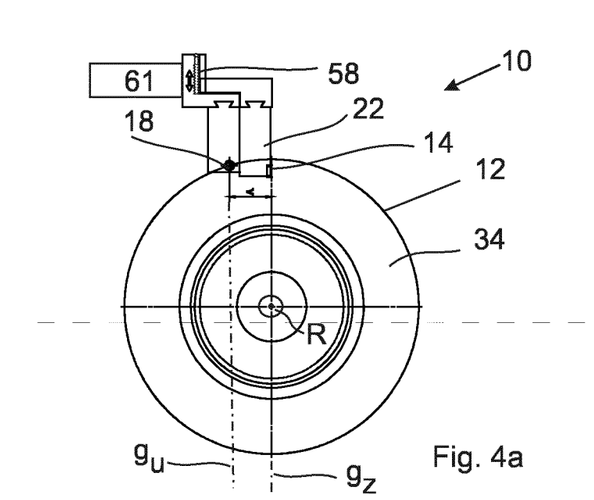

FIG. 4a shows a third embodiment of a brake disc tool 10 according to the invention for cutting in the form of rotational machining and simultaneously forming in the form of a rolling process. During machining, the cutting tools 14, 16 (see FIG. 4d) move on the respective cutting tool lines $g_Z$, which run through the rotational axis R. To this end, the cutting tools 14, 16 are guided linearly, as described above.

Figure 4B:
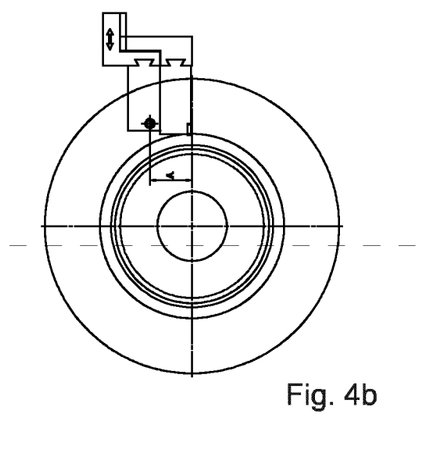

The first forming tool 18 is mounted relative to the first cutting tool 14 such that it is linearly guided. To this end, a linear axis 58 is configured between the first tool accommodation 22 and the first forming tool 18, wherein this axis can also be described as a linear guide. A motor of the linear axis 58 is depicted. FIGS. 4a and 4b depict the linear axis 58 in a first position, partial FIG. 4c depicts the linear axis 58 in a second position, in which the first forming tool 18 with a radial component is at a linear offset relative to the first tool accommodation 22.

Figure 4C:
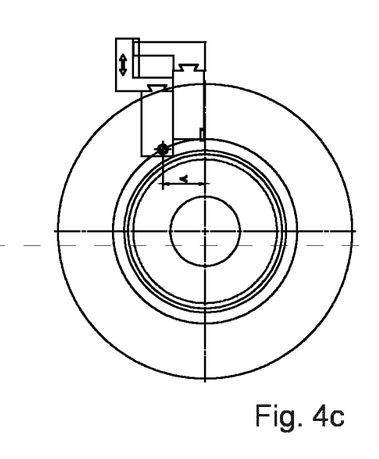
Figure 4D:
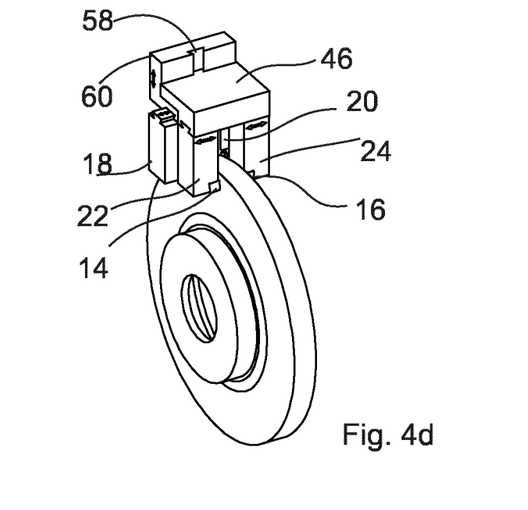

The second forming tool 20, part of which is visible in FIG. 4d, is fixed to a forming tool mount 60 in the same way as the first forming tool 18; this forming tool mount forms the linear axis 58 with the tool mount 46 to which the tool accommodations 22, 24 are fixed. In the present case, the linear axis 58 comprises a dovetail guide and a schematically depicted motor for moving the tool mount 46 relative to the forming tool mount 60. This results in the second forming 20 also being linearly guided relative to the second cutting tool 16. The tool mount or the forming tool mount 60 are fixed to a machine 61, which is partially schematically depicted.

Figure 4E:
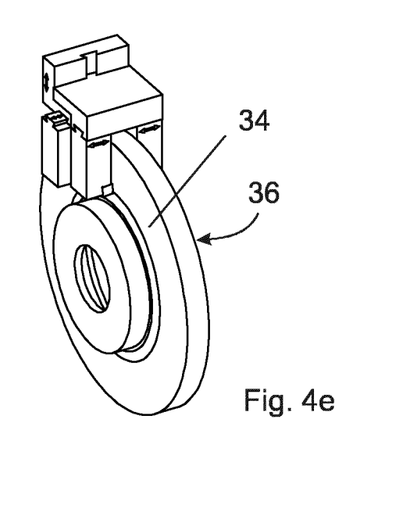
Figure 4F:
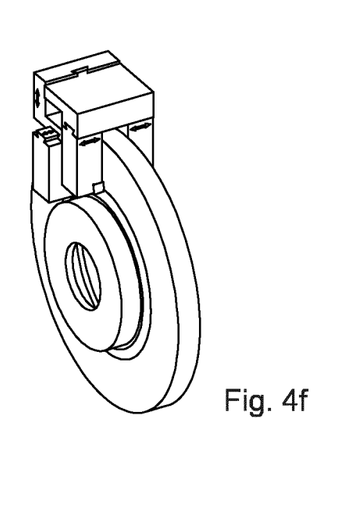

FIGS. 4a, 4b and 4c schematically depict the order of a method according to the invention. First of all, the forming tools 18, 20 and the cutting tools 14, 16 are moved radially inwards with the same radial movement component. The radial movement component is determined by the projection of the corresponding movement vector on the cutting tool line $g_Z$. If the state shown in FIG. 4b is achieved, in which the cutting tools 14, 16 have completely cut the brake surfaces 34, 36 (see FIG. 4e), the radially inwards movement of the cutting tools 14, 16 is stopped. The forming tools 18, 20 continue to move relatively inwards, i.e. in the feed direction, until the two brake surfaces 34, 36 have been fully rolled. All tools 14, 16, 18, 20 then disengage and the brake disc tool is moved radially outwards.

FIG. 5 shows another embodiment of a brake disc tool according to the invention. With this embodiment, the cutting tool line $g_Z$ and the forming tool line $g_U$ confine a spread angle σ, which is different to zero. In the present case, the lines $g_Z$, $g_U$ run through the rotational axis R, which represents a preferred, but not necessary, embodiment.

Figure 5A:
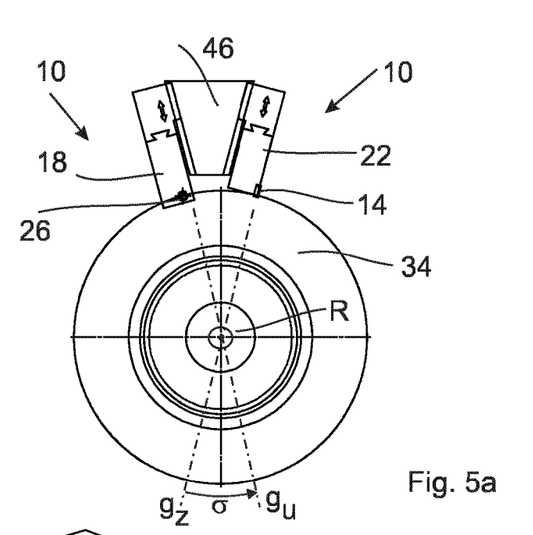
Figure 5B:
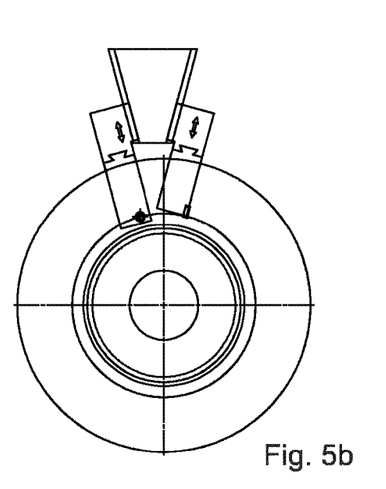
Figure 5C:
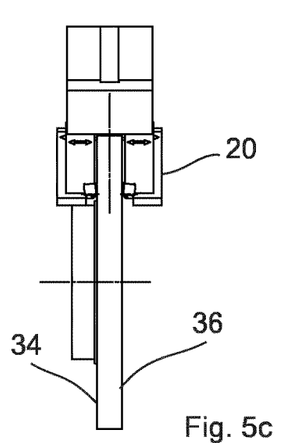
Figure 5D:
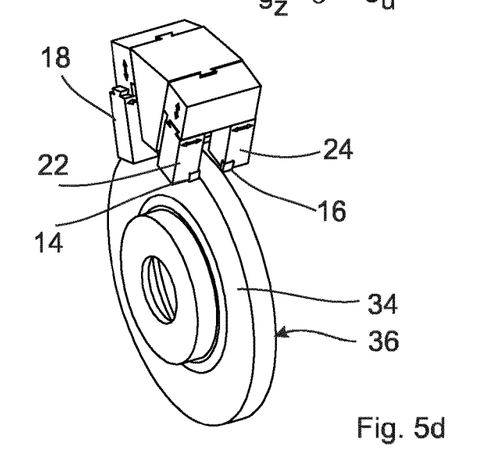
Figure 5E:
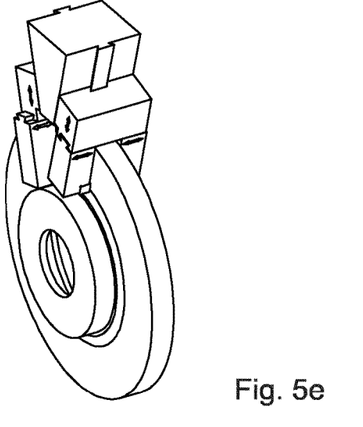
Figure 5F:
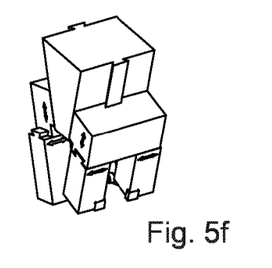

Both the tool accommodations 22, 24 (see FIG. 5b) and the forming tools 18, 20 (see FIG. 5c) are guided linearly on the tool mount 46 and are moved either simultaneously or consecutively. FIGS. 5a and 5b on the one hand and 5d and 5e on the other depict the order of a method according to the invention. At the beginning of the method, the tools 14, 16, 18, 20 are in a radially outwards position. During the method, they are moved radially inwards and the brake surfaces are machined 34, 36. Following machining, the tools disengage and are driven back, moving radially outwards. The tool mount 46 does not move during this process.

Figures 6A, 6B, 6D, 6E:
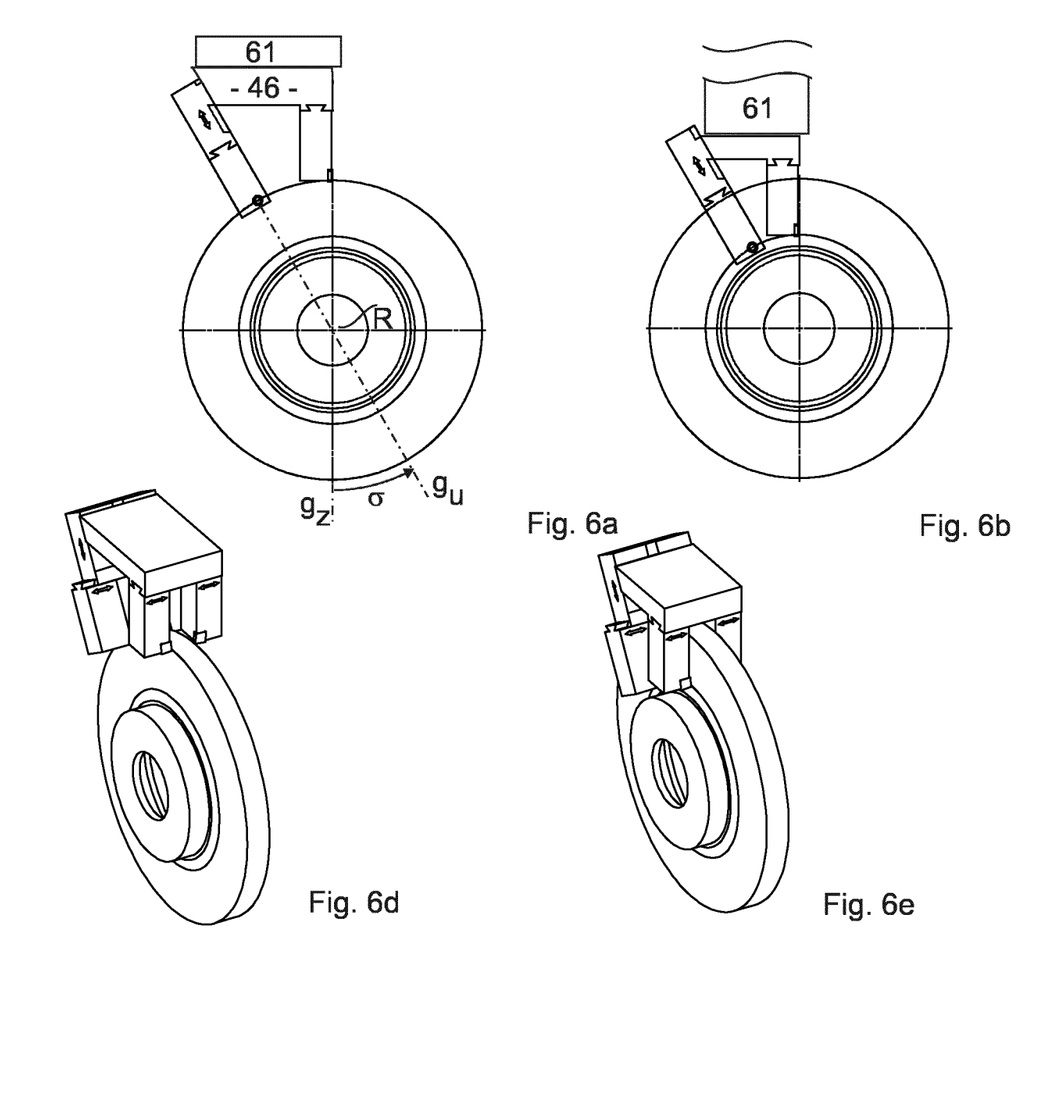
Figure 6C:
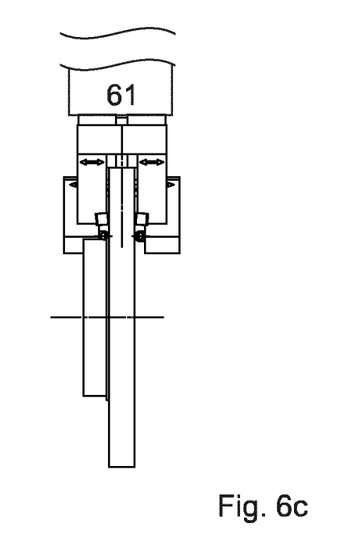
Figure 6F:
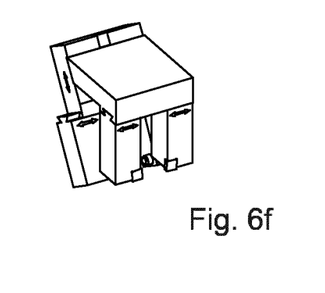

FIG. 6 depicts a fifth embodiment of a brake disc tool 10 according to the invention whereby the cutting line $g_Z$ and the forming line $g_U$ also run through the rotational axis R. Unlike the embodiment according to FIG. 5b, the tool mount 46 is linearly guided on the machine tool 61 such that it is moveable, so it can be moved during a method according to the invention.

The invention also envisages a machine tool that comprises a brake disc tool according to the invention. The tool mount 46 is preferably automatically linearly guided in this machine tool such that it can be moved.

Figure 7A:
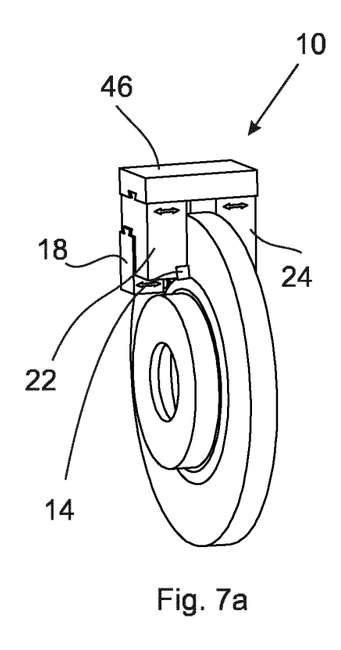
Figures 7B, 7C:
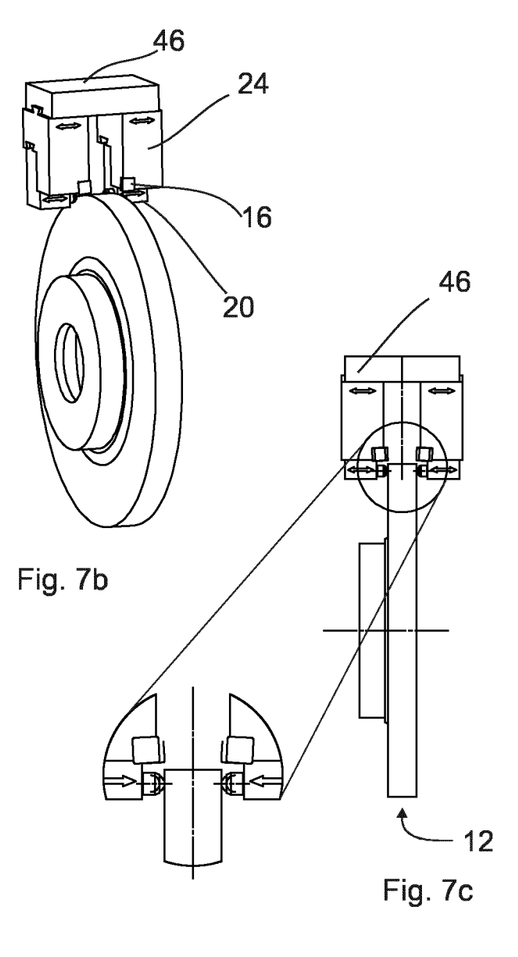
Figures 7D, 7E:
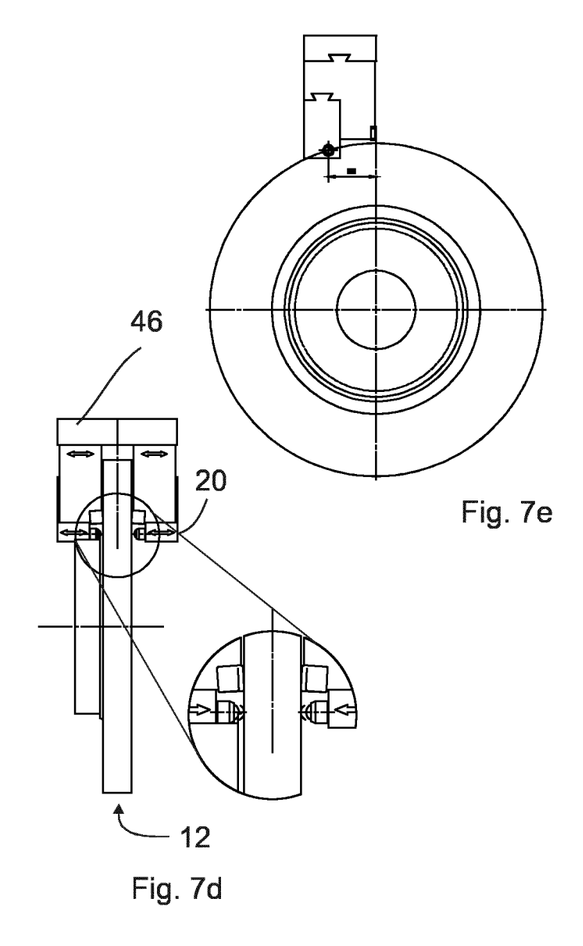

FIG. 7 shows a brake disc tool 10 according to the invention, all tools 14, 16, 20 of which are arranged in such a way that they can each be moved automatically relative to the tool mount 46. The tool mount 46 is guided, for example linearly, on the machine tool. As FIGS. 7c and 7d show, it is possible to engage and disengage all tools 14, 16, 18, 20 with/from the brake disc blank 12 independently of the respective other tools. In other words, the cutting tools 14, 16 are connected to the tool mount 46 such that a joint infeed movement can occur. The rolling elements 26, 28 can also be moved relative to the cutting tools 14, 16. This type of mounting of the tools 14, 16, 18, 20 is also possible for all other embodiments.

Figure 8A:
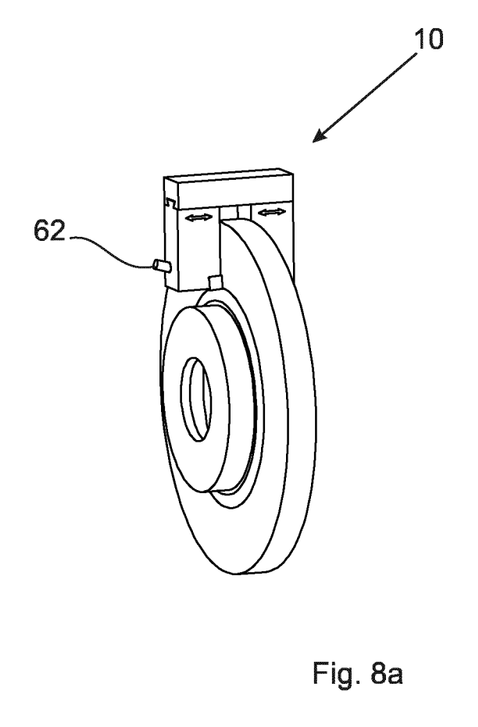
Figure 8B:
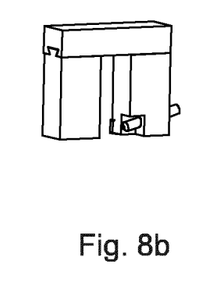

FIG. 8 shows a brake disc tool 10 according to the invention which comprises a vibration damping device 62, which is pressed against the first brake surface 34, for instance by means of compressed air or a pressure fluid. Vibrations lead to an oscillation of the vibration damping device 62, which is dampened by the internal friction of the pressurized fluid (compressed air or pressure fluid) or by the flow of the pressurized fluid through a nozzle. In general, the forming tools are preferably dampened to such a strong extent that an additional vibration damping device 62 is not necessary.

| Reference list | |
|---|---|
| 10 | brake disc tool |
| 12 | brake disc blank |
| 14 | first cutting tool |
| 16 | second cutting tool |
| 18 | first forming tool |
| 20 | second forming tool |
| 22 | first tool accommodation |
| 24 | second tool accommodation |
| 26 | rolling element |
| 28 | rolling element |
| 30 | guide |
| 32 | guide |
| 34 | first brake surface |
| 36 | second brake surface |
| 38 | hub section |
| 40 | groove |
| 42 | infeed device |
| 43 | cutting tool infeed device |
| 44 | drive |
| 45 | forming tool infeed device |
| 46 | tool mount |
| 48 | linear guide |
| 50 | brake disc production system |
| 52 | machine tool |
| 54 | brake disc rotation device |
| 56 | stamp |
| 58 | linear axis |
| 60 | forming tool mount |
| 61 | machine tool |
| 62 | vibration damping device |
| E | brake surface place |
| d | disc thickness |
| D | outer diameter |
| $g_Z$ | cutting tool line |
| $g_U$ | forming tool line |
| T | separating plane |
| n | groove width |
| P | point of engagement |
| R | rotational axis |
| Δr | difference in distance |
| ω | direction of rotation |
| σ | spread angle |

The invention claimed is:

1. A method for producing a brake disc by rotating a brake disc blank about a rotational axis by means of a brake disc rotation device of a machine tool, wherein the rotational axis is the same axis about which a brake disc rotates during operation, comprising:
(i) engaging a first cutting tool of a brake disc tool at a first cutting point of engagement which is at a first cutting distance from the rotational axis, so that the first cutting tool cuts a first brake surface of the brake disc blank;
(ii) engaging a second cutting tool of the brake disc tool at a second cutting point of engagement which is at a second cutting distance from the rotational axis, so that the second cutting tool cuts a second brake surface of the brake disc blank;
(iii) engaging a first forming tool of the brake disc tool at a first forming point of engagement which is at a first forming distance from the rotational axis, so that the first brake surface is formed;
(iv) engaging a second forming tool of the brake disc tool at a second forming point of engagement which is at a second forming distance from the rotational axis, so that the second brake surface is formed,
wherein the first cutting point of engagement and the first forming point of engagement form an angle with the rotational axis, this angle having an angle bisector; and
(v) moving the first and second cutting tools and the first and second forming tools such that, at least when all tools are engaged,
a first difference in distance between
a projection of the first cutting point of engagement onto the bisector and
a projection of the first forming point of engagement onto the bisector or
a second difference in distance between
a projection of the second cutting point of engagement onto the bisector and
a projection of the second forming point of engagement onto the bisector
remains constant and/or does not exceed a radial distance between the first and second brake surfaces and a hub section of the brake disc blank which protrudes axially above a brake surface plane on which the first brake surface lies.

2. The method according to claim 1 further comprising:
(i) infeeding of the first and second cutting tools and the first and second forming tools onto the first and second brake surfaces of the brake disc blank,
(ii) rotating the brake disc blank, and
(iii) simultaneously cutting and forming the first and second brake surfaces.

3. The method according to claim 1 further comprising:
(i) infeeding of the first and second cutting tools, followed by
(ii) rotating the brake disc blank in a first direction of rotation and the cutting of the brake surfaces, followed by
(iii) rotating the brake disc blank in an opposite direction of rotation and simultaneously forming the first and second brake surfaces.

4. The method according to claim 1 further comprising:
moving the first and second cutting tools and the first and second forming tools radially inwards to disengage the tools from the cutting and forming points of engagement respectively,
engaging the first and second cutting tools and the first and second forming tools at cutting and forming points of engagement respectively that are different from the first and second cutting and forming points of engagement followed by
moving the first and second cutting tools and the first and second forming tools radially outwards and simultaneously cutting and forming of the brake surfaces.

5. The method according to claim 1, further comprising:
moving the second forming tool and the second cutting tool radially inwards, followed by
stopping of the radially inwards movement of the second cutting tool and
continuing the radially inwards movement of the second forming tool.

6. The method according to claim 1, further comprising:
rotating of the brake disc blank in a first direction of rotation while cutting of the brake surfaces; and
rotating the brake disc blank in an opposite direction of rotation while forming the first and second brake surfaces.

7. The method according to claim 1 further comprising:
moving the first and second cutting tools radially inwards to disengage the tools from the cutting points of engagement,
engaging the first and second forming tools at the forming points of engagement followed by
moving the first and second forming tools radially outwards to form the brake surfaces.

8. A method for producing a brake disc by rotating a brake disc blank about a rotational axis by means of a brake disc rotation device of a machine tool, wherein the rotational axis is the same axis about which a brake disc rotates during operation, comprising:
engaging a first cutting tool of a brake disc tool at a first cutting point of engagement which is at a first cutting distance from the rotational axis, so that the first cutting tool cuts a first brake surface of the brake disc blank;
engaging a second cutting tool of the brake disc tool at a second cutting point of engagement which is at a second cutting distance from the rotational axis, so that the second cutting tool cuts a second brake surface of the brake disc blank;
engaging a first forming tool of the brake disc tool at a first forming point of engagement which is at a first forming distance from the rotational axis, so that the first brake surface is formed;
engaging a second forming tool of the brake disc tool at a second forming point of engagement which is at a second forming distance from the rotational axis, so that the second brake surface is formed,
moving the first forming tool and the first cutting tool radially inwards, followed by
stopping of the radially inwards movement of the first cutting tool and
continuing the radially inwards movement of the first forming tool.

* * * * *